(12) United States Patent
Gugnani et al.

(10) Patent No.: US 11,436,158 B2
(45) Date of Patent: Sep. 6, 2022

(54) FINE-GRAINED FORCED CACHE EVICTION

(71) Applicant: International Business Machines Corporation, Armonk, NY (US)

(72) Inventors: Shashank Gugnani, Columbus, OH (US); D Scott Guthridge, San Jose, CA (US); Frank Schmuck, Campbell, CA (US); Owen T. Anderson, Bellevue, WA (US); Deepavali M. Bhagwat, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 16/888,251

(22) Filed: May 29, 2020

(65) Prior Publication Data
US 2021/0374073 A1    Dec. 2, 2021

(51) Int. Cl.
| | |
|---|---|
| *G06F 12/121* | (2016.01) |
| *G06F 12/0891* | (2016.01) |
| *G06F 21/62* | (2013.01) |
| *G06F 12/1081* | (2016.01) |
| *G06F 12/0873* | (2016.01) |

(52) U.S. Cl.
CPC ........ *G06F 12/121* (2013.01); *G06F 12/0873* (2013.01); *G06F 12/0891* (2013.01); *G06F 12/1081* (2013.01); *G06F 21/6209* (2013.01)

(58) Field of Classification Search
None
See application file for complete search history.

(56) References Cited

U.S. PATENT DOCUMENTS

| | | | |
|---|---|---|---|
| 6,212,605 B1 | 4/2001 | Arimilli et al. | |
| 6,418,510 B1 * | 7/2002 | Lamberts | G06F 3/0611 710/43 |
| 6,968,429 B2 | 11/2005 | Civlin | |
| 8,190,914 B2 | 5/2012 | van Riel et al. | |
| 8,966,184 B2 | 2/2015 | Atkisson | |
| 9,235,443 B2 | 1/2016 | Chockier et al. | |
| 9,477,603 B2 | 10/2016 | Waldspurger et al. | |
| 9,710,383 B1 * | 7/2017 | Xu | G06F 12/0246 |
| 9,904,805 B2 | 2/2018 | Chhabra et al. | |
| 2006/0143396 A1 | 6/2006 | Cabot | |

(Continued)

OTHER PUBLICATIONS

Yan et al., "Secure Hierarchy-Aware Cache Replacement Policy (SHARP): Defending Against Cache-Based Side Channel Attacks," Proceedings of ISCA '17, Jun. 2017, 14 pages.

(Continued)

*Primary Examiner* — Charles J Choi
(74) *Attorney, Agent, or Firm* — Zilka-Kotab, P.C.

(57) ABSTRACT

A computer-implemented method includes using a cache replacement algorithm to forcefully evict target data from a cache. Using the cache replacement algorithm includes selectively accessing data in the cache. A computer program product includes one or more computer readable storage media and program instructions collectively stored on the one or more computer readable storage media. The program instructions include program instructions to perform the foregoing method. A system includes a processor and logic integrated with the processor, executable by the processor, or integrated with and executable by the processor. The logic is configured to perform the foregoing method.

20 Claims, 4 Drawing Sheets

(56) References Cited

U.S. PATENT DOCUMENTS

| | | | | |
|---|---|---|---|---|
| 2007/0233947 A1* | 10/2007 | Coulson | ............. | G06F 12/0804 |
| | | | | 711/113 |
| 2014/0047181 A1* | 2/2014 | Peterson | ............... | G06F 12/121 |
| | | | | 711/118 |
| 2017/0329720 A1* | 11/2017 | Bedi | ................... | G06F 12/0813 |

OTHER PUBLICATIONS

Kim et al., "A Hybrid Cache Architecture for Meeting Per-Tenant Performance Goals in a Private Cloud," arXiv, Jun. 4, 2019, 11 pages, retrieved from https://arxiv.org/pdf/1906.01260.pdf.
IBM, "Cache eviction," IBM Knowledge Center, pp. 1-5, retrieved Mar. 25, 2020, from https://www.ibm.com/support/knowledgecenter/en/STXKQY_5.0.3/com.ibm.spectrum.scale.v5r03.doc/bl1ins_cacheevictionafm.htm.

* cited by examiner

FINE-GRAINED FORCED CACHE EVICTION

BACKGROUND

The present invention relates to cache overloading, and more specifically, this invention relates to fine-grained control over cache eviction and forced cache eviction.

Caches are used to speed up application performance. Conventional caches do not always provide fine-grained control (e.g., individual access control policies) to applications for controlling eviction of data from the cache.

SUMMARY

A computer-implemented method, according to one embodiment, includes using a cache replacement algorithm to forcefully evict target data from a cache. Using the cache replacement algorithm includes selectively accessing data in the cache.

A computer program product, according to another embodiment, includes one or more computer readable storage media and program instructions collectively stored on the one or more computer readable storage media. The program instructions include program instructions to perform the foregoing method.

A system, according to another embodiment, includes a processor and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for fine-grained control over cache eviction.

In one general embodiment, a computer-implemented method includes using a cache replacement algorithm to forcefully evict target data from a cache. Using the cache replacement algorithm includes selectively accessing data in the cache.

In another general embodiment, a computer program product includes one or more computer readable storage media and program instructions collectively stored on the one or more computer readable storage media. The program instructions include program instructions to perform the foregoing method.

In another general embodiment, a system includes a processor and logic integrated with the processor, executable by the processor, or integrated with and executable by the processor. The logic is configured to perform the foregoing method.

Figure 1:
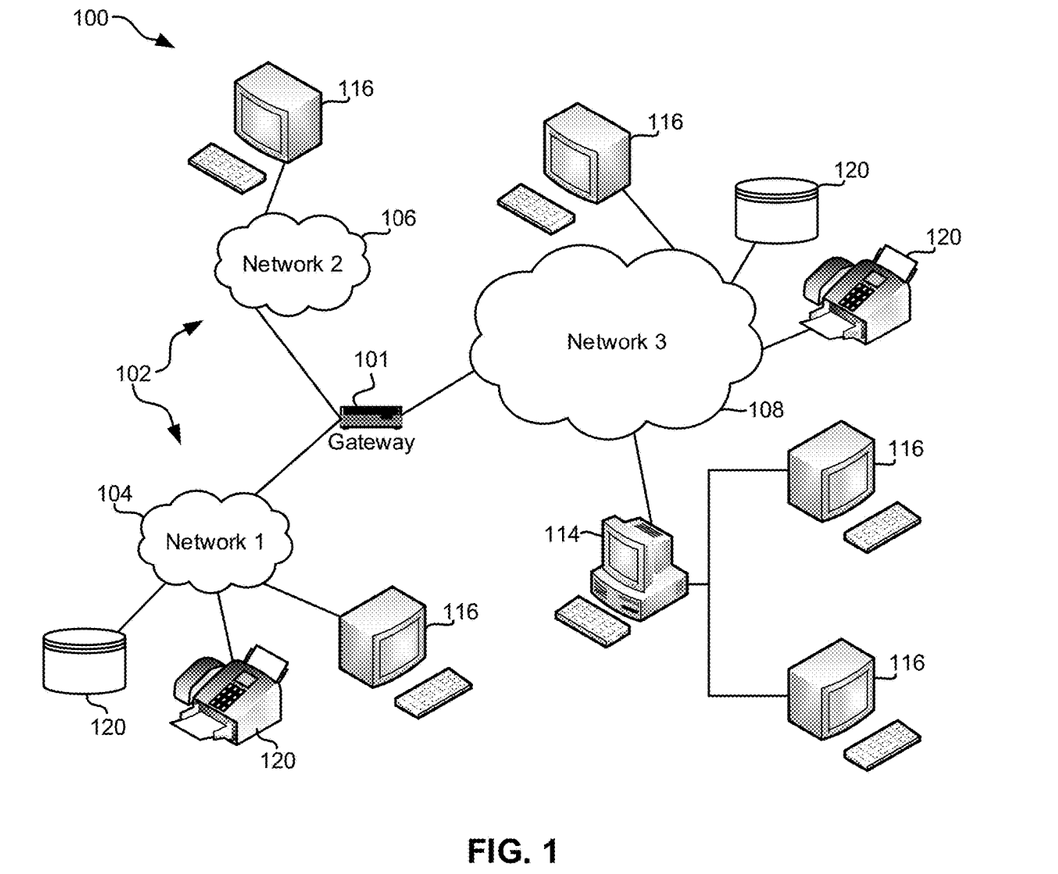
FIG. 1 is a diagram of a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 116 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
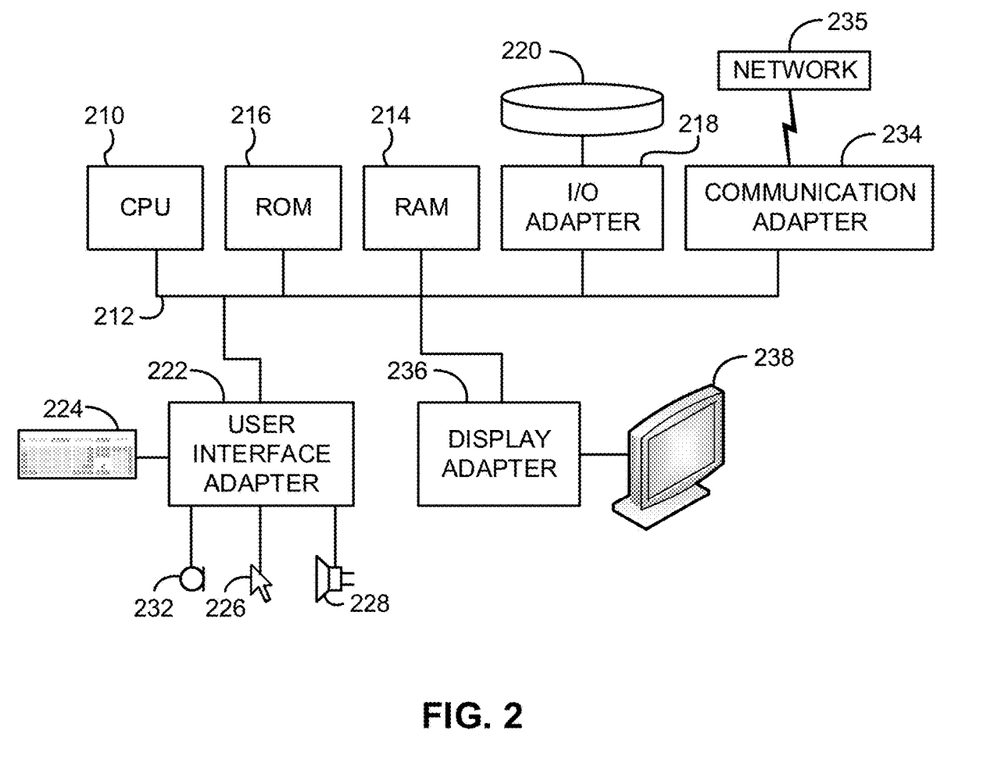
FIG. 2 is a diagram of a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
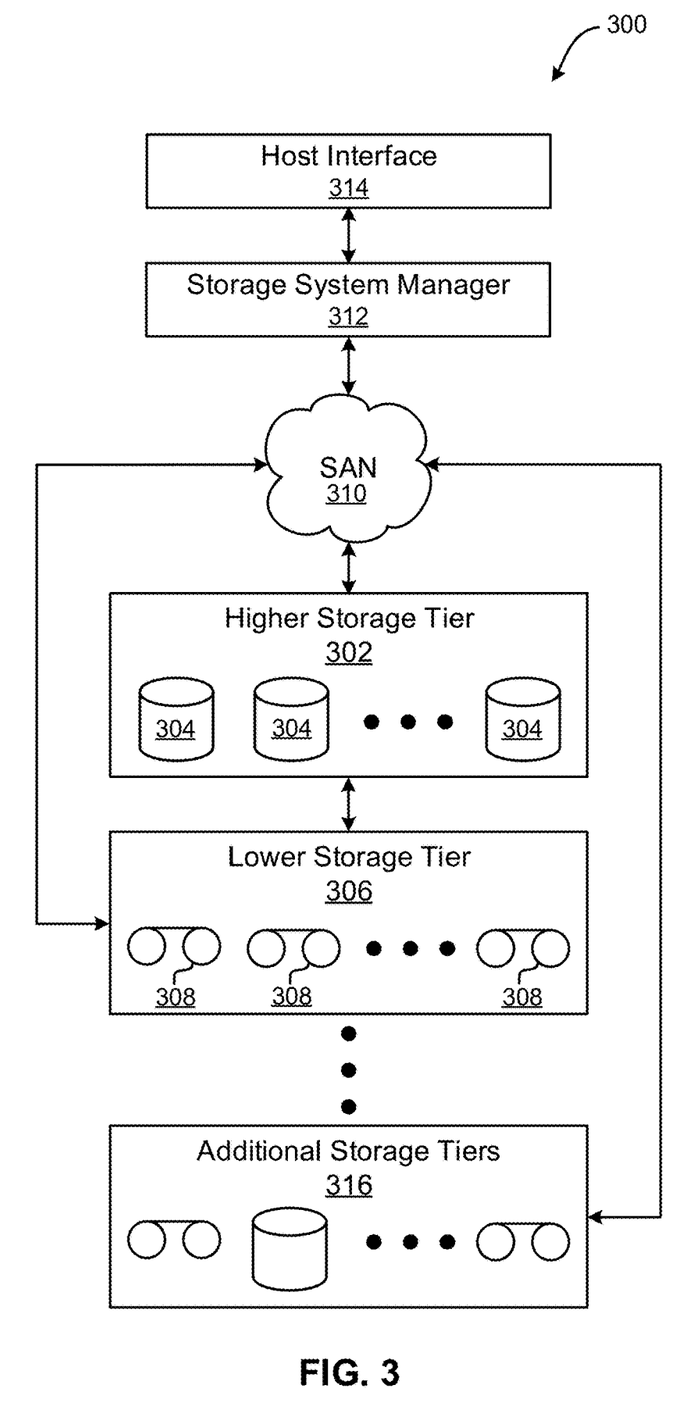
FIG. 3 is a diagram of a tiered data storage system, in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), non-volatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Caches are used to speed up application performance. Conventional caches do not always provide fine-grained control (e.g., individual access control policies) to applications for controlling eviction of data from the cache. It would be desirable to have fine control over what data goes into a cache, what data to evict and when to evict that data. Various current technologies flush the entire contents of the cache. Flushing the entire contents of the cache is inefficient if there is data that should remain in the cache and that data is unnecessarily flushed and/or more data is flushed than required. Other conventional technologies may use fine-grained interfaces to selectively flush data. Fine-grained interfaces may be unavailable and/or there may be reasons one may want to avoid using them. Fine-grained interfaces are specific hardware instructions (e.g., cache-flush instructions) which individually flush the individual cache lines. These interfaces become unavailable when writing to the cache over a network using a remote processor. In addition, these interfaces may be insufficiently fine-grained where flushing cache lines flush data that should remain in the cache and/or flush more data than is required. Other conventional technologies focus on keeping relevant data in the cache rather than forcefully evicting data from the cache. These technologies improve performance by keeping data that is meaningful in the cache as opposed to forcefully evicting data for any of the uses described herein.

In stark contrast, at least some of the approaches disclosed herein provide for forcefully evicting data from a cache. At least some of the various embodiments may be useful for ensuring confidential data is not left in the cache. Another application of various embodiments disclosed herein includes ensuring persistence of data when using a volatile cache backed by non-volatile media. In preferred approaches, the cache resides on a remote system and accesses to the cache in the remote system are performed using RDMA.

Figure 4:
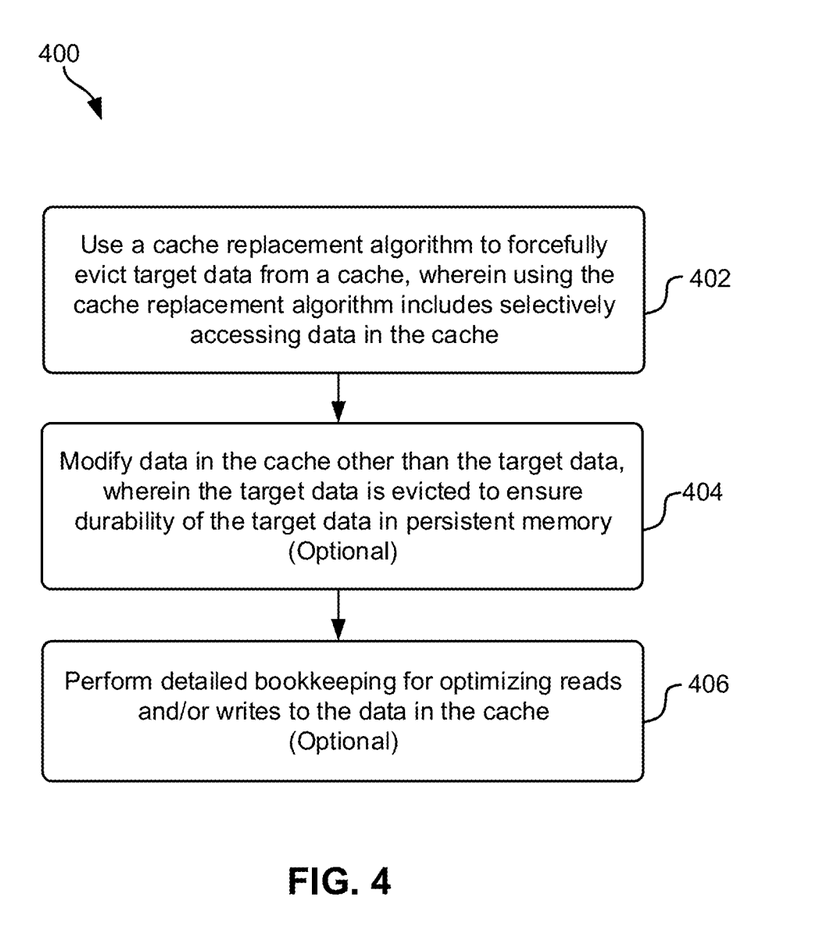
FIG. 4 is a flowchart of a method, in accordance with one embodiment of the present invention.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 includes operation 402. Operation 402 includes using a cache replacement algorithm to forcefully evict target data from a cache. Using the cache replacement algorithm includes selectively accessing data in the cache. For example, using the cache replacement algorithm may include selectively accessing data in the cache to ensure that target data, given by an associated data address, is evicted from the cache. The cache replacement algorithm may be of any type known in the art.

Method 400 optionally includes operation 404. Operation 404 includes modifying the data in the cache other than the target data. Modifying the data in the cache other than the target data may be performed in any manner known in the art. The cache may comprise the target data and data other than the target data as would be understood by one having ordinary skill in the art in view of the present disclosure. The target data may be evicted in some approaches to ensure the durability of the target data in persistent memory.

Method 400 optionally includes operation 406. Operation 406 includes performing detailed bookkeeping for optimizing reads and/or writes to the data in the cache. Detailed bookkeeping may include data to be written, data to be read, written data, read data, any combination thereof, and/or reference information corresponding thereto. Detailed bookkeeping may be used to batch memory accesses by determining whether data to be read and/or written aliases target data. Detailed bookkeeping may be used to optimize eviction of data from the cache by using desired reads and/or writes to the cache which would otherwise be performed (e.g., rather than using reads and/or writes which are only performed to force the eviction). In another approach, detailed bookkeeping may be used to batch evictions, thereby minimizing the number of memory accesses for performing forced evictions.

In one approach, an alias refers to separate cache lines sharing a set number with the target data (e.g., mapped to the same set as the target data). A set number refers to a set of cache lines as would be understood by one having ordinary skill in the art. Aliases may refer to memory addresses in the same set.

In one embodiment, selectively accessing data in the cache includes generating a sequence of accesses to a group of aliases (e.g., alternatively referred to as the target set). Depending on the cache replacement algorithm, the sequence may access alias bytes only or the sequence may include one or more accesses to the target data. An algorithm for generating a sequence of accesses may be readily determinable by one having ordinary skill in the art in view of the present disclosure, the cache replacement algorithm, the target data to be evicted, etc.

In various approaches, accessing the group of aliases includes reading and/or writing to the cache. In some approaches, reading and/or writing to memory associated with the cache may include reading and/or writing "dummy data" to the cache. In other approaches, data in the cache may be modified as described above. The data in the cache may comprise the target data and data other than the target data. The target data may be evicted to ensure durability of the target data in persistent memory according to operations discussed in detail below. In other approaches, selectively accessing through detailed bookkeeping (e.g., described in further detail below) optimizes actual reads and/or writes (e.g., non-dummy data) to memory for using the cache replacement algorithm.

The sequence of accesses preferably ensures that the target data is evicted from the cache as long as the cache eviction algorithm is deterministic. Deterministic cache eviction algorithms usable in various embodiments may be any known deterministic cache eviction algorithm, such as: least recently used (LRU), pseudo-LRU, most recently used (MRU), pseudo-MRU, first-in/first-out (FIFO), last-in/first-out (LIFO), etc.

In a preferred approach, basic information about the organization of the cache may be gathered including the set size, associativity information, etc. The cache replacement algorithm is also gathered and/or determined. In various approaches, the cache replacement algorithm and the information about the organization of the cache may be determined in any manner known in the art. For example, the cache replacement algorithm may be determined via the hardware specification association with the system. In another example, known methods may be used to determine the cache replacement algorithm.

In a set-associative cache, the cache comprises sets and each set comprises a number of ways (e.g., in a n-way set-associative cache). An algorithm may be applied to the memory addresses to remove the lower bits from the memory addresses, leaving the tag. The bottom bits of the addresses are the offset within the cache line and the upper bits are the tag. The tag modulo number of the sets in the cache may be used to indicate which of the sets contains the records for the address.

In an n-way associative cache, knowledge of the organization of the cache may be used to determine a sequence of memory accesses to addresses which are in the same cache line (e.g., same cache set). For example, for a cache having a least recently used cache replacement algorithm, in a set that is 8 way associative, accessing 8 different items (e.g., locations) other than the target data to be evicted, results in eviction of the oldest items first. Accessing the 8 different locations results in evicting the least recently used line. Accesses for all the lines are performed after accessing the cache line comprising target data to be evicted. The cache line comprising the target data is accessed the earliest, thereby resulting in eviction of the target data from the set (e.g., due to the cache line's status as the least recently used cache line).

In a most recently used cache replacement algorithm, data that was accessed the latest is evicted and replaced with new data. In this example, a sequence of accesses may include accessing 8 locations that alias into the same set as the target data to be evicted such that the target line is always the most recently accessed line, and thus will be evicted once the set being accessed is full.

In an exemplary algorithm for using the cache replacement algorithm is described below:

```
Input:
    eviction algorithm         : e
    cache associativity        : y
    target cache line          : d
Algorithm:
    let s = set no. of d
    let L[y] = distinct cache lines different from d sharing set s
    if e in [MRU, pseudo-MRU, LIFO] then
        for x in L
            access d
            access x
    else if e in [LRU, pseudo-LRU, FIFO] then
        for x in L
            access x
    else . . .
```

In the foregoing exemplary algorithm, d is the target cache line comprising the target data to be evicted and L is the array of distinct cache lines different from the target cache line (e.g., aliases to the same set as the target data). The foregoing exemplary algorithm assumes knowledge of the cache replacement algorithm. The exemplary algorithm finds the first set cache which belongs to the memory address.

Writing excessive data for using the cache replacement algorithm may be inefficient if more dummy data is written than desired data. To address this potential inefficiency, at least some approaches include operations for careful bookkeeping of data to be written in order predict the eviction of each cache line as described above. For example, with two consecutive writes to the cache, the latter of the writes may serve as part of an evict alias for the former write and the former write may serve as part of a load alias for the latter of the writes. According to this approach, accessing additional alias data may be kept to a minimum. Extra data for writes to aliases for the sequence of accesses may be optimized to reduce the number of writes to aliases for forcing eviction rather than performing all the accesses to evict target data from a first cache line and then performing all the access to evict target data from a second cache line. Rather than reading and/or writing data that is subsequently thrown away, if there is actually data to be read and/or written which aliases target data, detailed bookkeeping may be used to batch up the memory accesses for a plurality of evictions.

One important application for the various embodiments disclosed herein includes guaranteeing persistence of data in the cache where the cache is a volatile cache backed by non-volatile media (e.g., RDMA to persistent memory). The cache preferably resides on a remote system. Accesses to the cache in a remote system may be performed using RDMA as would be understood by one having ordinary skill in the art. RDMA writes to persistent memory are not immediately persistent and may be cached in the last level cache (LLC). Forcefully evicting data from LLC by overloading the LLC guarantees of data persistence for design of crash consistent systems. Data written to a remote node may be persisted without involving the central processing unit (CPU) on the remote node. Flushing data out of the cache persists data into the memory during power failures where there is persistent memory behind the cache.

Other applications for at least some of the approaches described herein involve security and thwarting software cache-based side channel attacks. The cache may contain confidential data which is undesirable to be accessible to other users. Confidential data may be mistakenly accessed if left in the cache. Forcefully evicting confidential data from the cache is helpful in maintaining security and privacy. Confidential data may be determined and/or indicated as target data in any manner known in the art.

Yet another application for some of the embodiments include performance testing by priming. For example, various embodiments of the present disclosure may be used to clean a cache and test performance of the cache between cleaning the caches.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
using a cache replacement algorithm to forcefully evict target data from a cache, wherein the cache replacement algorithm is deterministic, wherein using the cache replacement algorithm includes selectively accessing data in the cache, wherein the target data is mapped to a set in the cache, wherein an alias is mapped to the same set as the target data, wherein the cache is a volatile cache backed by non-volatile media, wherein the accesses to the cache are performed using remote direct memory access (RDMA), wherein the RDMA writes to persistent memory are not immediately persistent.

2. The computer-implemented method of claim 1, wherein the deterministic cache replacement algorithm is selected from the group consisting of: least recently used (LRU), pseudo-LRU, most recently used (MRU), pseudo-MRU, first-in/first-out (FIFO), and last-in/first-out (LIFO); wherein selectively accessing the cache includes performing reads and/or writes on the target data in the cache, wherein at least some of the reads and/or writes are only performed to force the eviction of the target data.

3. The computer-implemented method of claim 1, comprising modifying data in the cache other than the target data, wherein the modification is only performed to force the eviction of the target data, wherein the target data is evicted to ensure durability of the target data in persistent memory.

4. The computer-implemented method of claim 1, wherein the cache resides on a remote system, wherein the RDMA writes are cached in a last level cache (LLC) for enabling data persistence.

5. The computer-implemented method of claim 1, wherein selectively accessing the data in the cache includes accessing aliases mapped to the same set as the target data.

6. The computer-implemented method of claim 1, comprising performing detailed bookkeeping for optimizing reads and/or writes to the data in the cache, wherein detailed bookkeeping includes using batch memory accesses to optimize eviction of the target data from the cache using reads and/or writes which would otherwise be performed.

7. The computer-implemented method of claim 1, wherein selectively accessing the data in the cache includes performing reads and/or writes on aliases mapped to the same set as the target data, wherein the reads and/or writes are only performed to force the eviction of the target data.

8. A computer program product, the computer program product comprising:
one or more computer readable storage media, and program instructions collectively stored on the one or more computer readable storage media, the program instructions comprising:
program instructions to use a cache replacement algorithm to forcefully evict target data from a cache, wherein using the cache replacement algorithm includes selectively accessing data in the cache, wherein the target data is mapped to a set in the cache, wherein an alias is mapped to the same set as the target data,
wherein the cache resides on a remote system, wherein the accesses to the cache in the remote system are performed using remote direct memory access (RDMA), wherein the RDMA writes to persistent memory are not immediately persistent, wherein the RDMA writes are cached in a last level cache (LLC) for enabling data persistence.

9. The computer program product of claim 8, wherein selectively accessing the cache includes performing reads and/or writes on the target data in the cache, wherein at least some of the reads and/or writes are only performed to force the eviction of the target data.

10. The computer program product of claim 8, comprising program instructions to modify data in the cache other than the target data, wherein the modification is only performed to force the eviction of the target data, wherein the target data is evicted to ensure durability of the target data in persistent memory.

11. The computer program product of claim 8, wherein the cache replacement algorithm is deterministic, wherein the deterministic cache replacement algorithm is selected from the group consisting of: least recently used (LRU), pseudo-LRU, most recently used (MRU), pseudo-MRU, first-in/first-out (FIFO), and last-in/first-out (LIFO).

12. The computer program product of claim 8, wherein selectively accessing the data in the cache includes accessing aliases mapped to the same set as the target data.

13. The computer program product of claim 8, comprising program instructions to perform detailed bookkeeping for optimizing reads and/or writes to the data in the cache, wherein detailed bookkeeping includes using batch memory accesses to optimize eviction of the target data from the cache using reads and/or writes which would otherwise be performed.

14. The computer program product of claim 8, wherein selectively accessing the data in the cache includes performing reads and/or writes on aliases mapped to the same set as the target data, wherein the reads and/or writes are only performed to force the eviction of the target data.

15. A system, comprising:
a processor; and
logic integrated with the processor, executable by the processor, or integrated with and executable by the processor, the logic being configured to:
use, by the processor, a cache replacement algorithm to forcefully evict target data from a cache, wherein the cache replacement algorithm is deterministic, wherein using the cache replacement algorithm includes selectively accessing data in the cache, wherein selectively accessing the data in the cache includes accessing aliases mapped to the same set as the target data, wherein the cache is a volatile cache backed by non-volatile media,
wherein the accesses to the cache are performed using direct memory access, wherein the direct memory access writes to persistent memory are not immediately persistent, wherein the direct memory access writes are cached in a last level cache (LLC) for enabling data persistence.

16. The system of claim 15, wherein selectively accessing the cache includes performing reads and/or writes on the target data in the cache, wherein the reads and/or writes are only performed to force the eviction of the target data.

17. The system of claim 15, comprising logic configured to modify, by the processor, data in the cache other than the target data, wherein the modification is only performed to force the eviction of the target data, wherein the target data is evicted to ensure durability of the target data in persistent memory.

18. The system of claim 15, wherein the cache resides on a remote system, wherein the accesses to the cache in the remote system are performed using remote direct memory access (RDMA), wherein the RDMA writes to persistent memory are not immediately persistent, wherein the RDMA writes are cached in the LLC.

19. The system of claim 15, wherein the target data is confidential data.

20. The system of claim 15, wherein the deterministic cache replacement algorithm is selected from the group consisting of: least recently used (LRU), pseudo-LRU, most recently used (MRU), pseudo-MRU, first-in/first-out (FIFO), and last-in/first-out (LIFO); wherein selectively accessing the data in the cache includes performing reads and/or writes on aliases mapped to the same set as the target data, wherein the reads and/or writes are only performed to force the eviction of the target data.

\* \* \* \* \*